(12) United States Patent
Henriksson

(10) Patent No.: US 7,932,840 B2
(45) Date of Patent: Apr. 26, 2011

(54) SYSTEMS AND METHODS FOR CHANGING CHARACTERS ASSOCIATED WITH KEYS

(75) Inventor: Michael Henriksson, Loddekopinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1019 days.

(21) Appl. No.: 11/747,278

(22) Filed: May 11, 2007

(65) Prior Publication Data

US 2008/0278352 A1    Nov. 13, 2008

(51) Int. Cl.
*H01H 21/00* (2006.01)
(52) U.S. Cl. ............................... 341/22; 200/314; 341/23
(58) Field of Classification Search .................. None
See application file for complete search history.

(56) References Cited

U.S. PATENT DOCUMENTS

| 4,078,257 A | 3/1978 | Bagley |
| 5,408,060 A | 4/1995 | Muurinen |
| 2007/0171503 A1 | 7/2007 | Luo |

FOREIGN PATENT DOCUMENTS

| EP | 1 523 021 A1 | 4/2005 |
| FR | 2 881 853 A1 | 8/2006 |
| WO | WO 98/01876 | 1/1998 |

OTHER PUBLICATIONS

International Search Report and Written Opinion dated May 9, 2008 issued in corresponding PCT application No. PCT/IB2007/054521, 12 pages.

*Primary Examiner* — Brian A Zimmerman
*Assistant Examiner* — Hung Q Dang
(74) *Attorney, Agent, or Firm* — Harrity & Harrity, LLP

(57) ABSTRACT

A mobile communication device may include logic configured to provide a first keypad layout via a programmable keypad using a first illumination source, receive a keypad selection and provide a second keypad layout via the programmable keypad using a second illumination source in response to the selection.

14 Claims, 13 Drawing Sheets

SYSTEMS AND METHODS FOR CHANGING CHARACTERS ASSOCIATED WITH KEYS

TECHNICAL FIELD OF THE INVENTION

Implementations described herein relate generally to keypads for data entry, and more particularly, to keypads that can be used to provide multiple layouts.

DESCRIPTION OF RELATED ART

Devices, such as mobile communication devices, may be used by individuals in a variety of settings and modes due to the portability of these devices. Since individuals may have their mobile devices with them in many situations, these individuals may find it convenient if the mobile devices can be used to perform functions other than receiving or making calls. For example, individuals may find it convenient to play recorded songs on their mobile devices or to send an email from their mobile device when not engaged in a communication session. As the keys in the keypads of mobile communications devices are quite small, existing methods of providing a variety of functions on these small keys fail to easily allow a user to operate the mobile communications device in the variety of available modes.

SUMMARY

According to one aspect, a mobile communication device is provided. The mobile communication device may comprise a keypad assembly that comprises: a plurality of keys, wherein each of the plurality of keys contains a plurality of surfaces for displaying information; and a plurality of light sources; and logic configured to: receive a keypad selection from a user, and control the plurality of light sources to display selected information via each of the plurality of keys based on the received keypad selection.

Additionally a first displayed character may be displayed on a key by illuminating a first surface of the key using a first light source.

Additionally a second displayed character may be displayed on the key by illuminating a second surface of the key using a second light source.

Additionally the plurality of light sources may include backlighting light emitting diodes and side-lighting light emitting diodes.

Additionally the received keypad selection includes receiving a selection corresponding to at least one of a letters keypad, a numbers keypad, a music keypad, an email keypad or a symbols keypad.

According to another aspect, a method is provided. The method may include providing a plurality of keys, wherein each of the plurality of keys includes surfaces for displaying information, receiving a keypad configuration selection, and controlling one of a plurality of light sources to display selected information via each of the plurality of keys based on the received keypad configuration selection.

Additionally the surfaces for displaying information are located inside each of the plurality of keys.

Additionally the plurality of light sources may include backlighting LEDs and side-lighting LEDs.

Additionally the displayed selected information on each of the plurality of keys are displayed by illuminating one of a plurality of panels that include the selected information with either one of the backlighting LEDs or side-lighting LEDs.

Additionally the receiving a keypad configuration selection includes receiving a selection corresponding to at least one of a letters keypad, a numbers keypad, a music keypad, an email keypad or a symbols keypad.

According to another aspect a device is provided. The device may comprise: a first and second illumination sources; a programmable keypad configured to receive input from a user; and logic configured to: receive a request for a first configuration of the programmable keypad, control the first illumination source to provide the requested first configuration of the programmable keypad, receive a request for a second configuration of the programmable keypad, and control the second illumination source to provide the requested second configuration of the programmable keypad.

Additionally the programmable keypad includes a plurality of keys, wherein each of the plurality of keys contains a first and second surface, the first and second surfaces being angled with respect to a bottom surface of the programmable keypad.

Additionally the requested first configuration of the programmable keypad may be displayed on the first surface of each of the plurality of keys.

Additionally the requested second configuration of the programmable keypad may be displayed on the second surface of each of the plurality of keys.

Additionally the first and second surfaces may be located on inner surfaces of each of the plurality of keys.

According to another aspect, a method is provided. The method may include providing a first keypad layout via a programmable keypad using a first illumination source; receiving a programmable keypad selection; and providing a second keypad layout via the programmable keypad using a second illumination source in response to the selection.

Additionally the providing a first keypad layout may further comprise providing a first character on a first key within the programmable keypad.

Additionally the providing a second keypad layout may further comprise providing a second character on the first key within the programmable keypad.

Additionally the first character is provided on a first surface of the first key and the second character is provided on a second surface of the first key.

Additionally the first and second surfaces of the first key are located on inner surfaces of the first key.

BRIEF DESCRIPTION OF THE DRAWINGS

The accompanying drawings, which are incorporated in and constitute a part of this specification, illustrate an embodiment of the embodiments and, together with the description, explain the embodiments. In the drawings.

DETAILED DESCRIPTION OF THE INVENTION

The following detailed description of the embodiments refers to the accompanying drawings. The same reference numbers in different drawings may identify the same or similar elements. Also, the following detailed description does not limit the embodiments.

Implementations of the embodiments can be used to improve a user interface, such as a keypad, on a device (e.g., a communications device). Implementations of the embodiments may change the appearance and/or configuration of the user interface using logic, such as machine-readable instructions executed by a processing device. In some instances, the changing of the appearance and/or configuration of the user interface may be application controlled. That is, when a particular application is launched or being executed or a function associated with a particular application is being executed, the user interface may change based on the particular application.

Exemplary implementations of the embodiments will be described in the context of a mobile communications terminal. It should be understood that a mobile communication terminal is an example of a device that can employ a programmable keypad consistent with the principles of the embodiments and should not be construed as limiting the types or sizes of devices or applications that can use implementations of programmable keypads described herein. For example, programmable keypads consistent with the principles of the embodiments may be used on desktop communication devices, household appliances, such as microwave ovens and/or appliance remote controls, automobile radio faceplates, industrial devices, such as testing equipment, etc.

Figure 1:
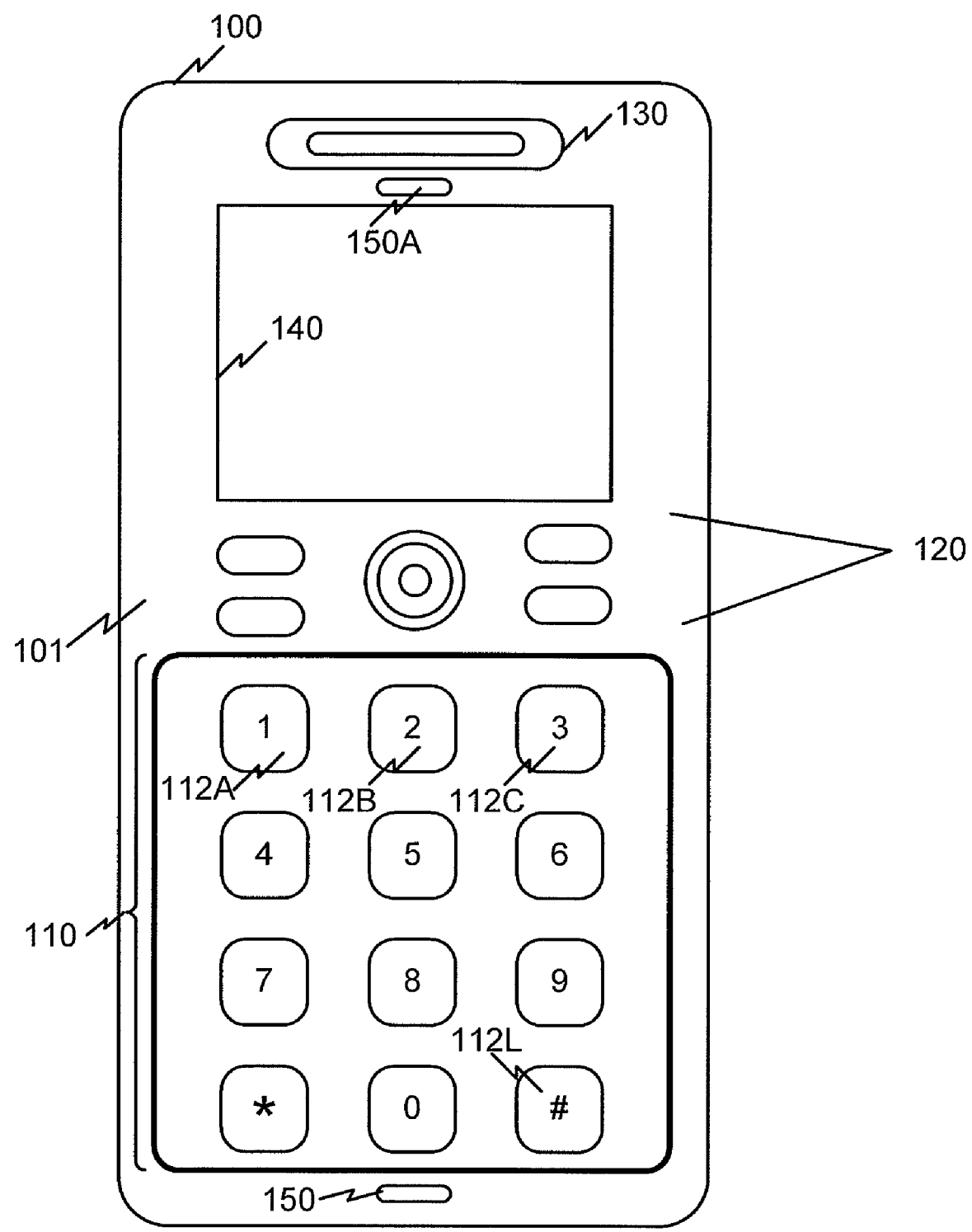
FIG. 1 is a diagram of an exemplary implementation of a mobile terminal.

FIG. 1 is a diagram of an exemplary implementation of a mobile terminal in which methods and systems described herein may be implemented. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

Terminal 100 may include housing 101, keypad 110 containing keys 112A-L, control keys 120, speaker 130, display 140, and microphones 150 and 150A. Housing 101 may include a structure configured to hold devices and components used in terminal 100. For example, housing 101 may be formed from plastic, metal, or composite and may be configured to support keypad 110, control keys 120, speaker 130, display 140 and microphones 150 and/or 150A.

Keypad 110 may include keys 112A-L that can be used to display characters to enable a user to interact with terminal 100. Implementations of keypad 110 may be configured to receive a user input when the user interacts with the displayed characters and/or symbols on keys 112A-L. For example, the user may provide an input to keypad 110 via pressing one of keys 112. User inputs received via keypad 110 may be processed by components or devices operating in terminal 100.

In one implementation, keypad 110 may be configured to display images via keys 112A-L (collectively keys 112). Implementations of keys 112 may have key information associated therewith, such as numbers, letters, symbols, etc. A user may interact with keys 112 to input key information into terminal 100. For example, a user may operate keys 112 to enter digits, commands, and/or text, into terminal 100.

Control keys 120 may include buttons that permit a user to interact with terminal 100 to cause terminal 100 to perform an action, such as to display a text message via display 140, raise or lower a volume setting for speaker 130, configure the appearance of keypad 110, etc.

Speaker 130 may include a device that provides audible information to a user of terminal 100. Speaker 130 may be located in an upper portion of terminal 100 and may function as an ear piece when a user is engaged in a communication session using terminal 100. Speaker 130 may also function as an output device for music and/or audio information associated with games and/or video images played on terminal 100.

Display 140 may include a device that provides visual information to a user. For example, display 140 may provide information regarding incoming or outgoing calls, text messages, games, phone books, the current date/time, volume settings, etc., to a user of terminal 100. Implementations of display 140 may be implemented as black and white or color displays, such as liquid crystal displays (LCDs).

Microphones 150 and/or 150A may, each, include a device that converts speech or other acoustic signals into electrical signals for use by terminal 100. Microphone 150 may be located proximate to a lower side of terminal 100 and may be configured to convert spoken words or phrases into electrical signals for use by terminal 100. Microphone 150A may be located proximate to speaker 130 and may be configured to receive acoustic signals proximate to a user's ear while the user is engaged in a communications session using terminal 100. For example, microphone 150A may be configured to receive background noise as an input signal for performing background noise cancellation using processing logic in terminal 100.

Figure 2:
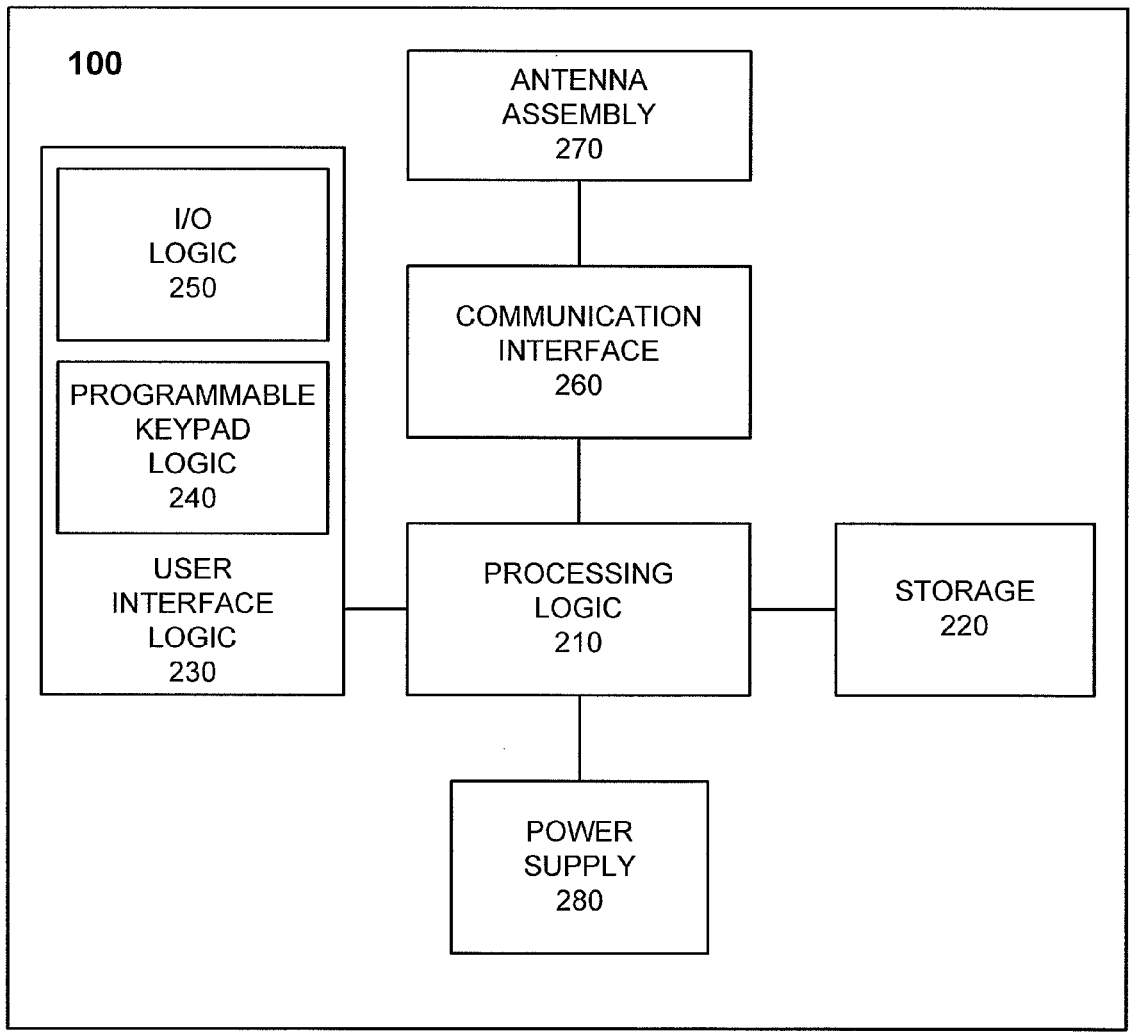
FIG. 2 illustrates an exemplary functional diagram of a mobile terminal.

FIG. 2 illustrates an exemplary functional diagram of a mobile terminal consistent with the principles of the embodiments. As shown in FIG. 2, terminal 100 may include processing logic 210, storage 220, user interface logic 230, communication interface 260, antenna assembly 270, and power supply 280.

Processing logic 210 may include a processor, microprocessor, an application specific integrated circuit (ASIC), field programmable gate array (FPGA), or the like. Processing logic 210 may include data structures or software programs to control operation of terminal 100 and its components. Implementations of terminal 100 may use an individual processing logic component or multiple processing logic components, such as processing logic components operating in parallel. Storage 220 may include a random access memory (RAM), a read only memory (ROM), a magnetic or optical disk and its corresponding drive, and/or another type of memory to store data and instructions that may be used by processing logic 210.

User interface logic 230 may include mechanisms, such as hardware and/or software, for inputting information to terminal 100 and/or for outputting information from terminal 100. In one implementation, user interface logic 230 may include programmable keypad logic 240 and input/output logic 250.

Programmable keypad logic 240 may include mechanisms, such as hardware and/or software, used to configure an appearance of keypad 110 and/or to receive user inputs via keypad 110. For example, programmable keypad logic 240 may change the characters and/or symbols associated with keys 112A-L (FIG. 1) using a menu of selections with which the user can interact. The menu may be based on a request received from a user of terminal 100, such as a request for a menu that allows the user to enter commands to perform desired actions with terminal 100. In some implementations, programmable keypad logic 240 may be application controlled and may automatically re-configure the appearance of keypad 110 based on an application being launched by the user of terminal 100, the execution of a function associated with a particular application/device included in terminal 100 or some other application specific event.

For example, if terminal 100 includes a media player and the user begins using the media player, programmable keypad logic 240 may change the appearance of keypad 110 to tailor the keypad 110 for the media player, as described in detail below. In another instance, terminal 100 may include an email function. If the user of terminal 100 presses a button associated with reading an email, terminal 100 may change the appearance of keypad 110 to tailor the keypad for the email functionality.

Input/output (I/O) logic 250 may include hardware or software to accept user inputs to make information available to a user of terminal 100. Examples of input and/or output mechanisms associated with input/output logic 250 may include a speaker (e.g., speaker 130) to receive electrical signals and output audio signals, a microphone (e.g., microphone 150 or 150A) to receive audio signals and output electrical signals, buttons (e.g., control keys 120) to permit data and control commands to be input into terminal 100, and/or a display (e.g., display 140) to output visual information.

Communication interface 260 may include, for example, a transmitter that may convert base band signals from processing logic 210 to radio frequency (RF) signals and/or a receiver that may convert RF signals to base band signals. Alternatively, communication interface 260 may include a transceiver to perform functions of both a transmitter and a receiver. Communication interface 260 may connect to antenna assembly 270 for transmission and reception of the RF signals. Antenna assembly 270 may include one or more antennas to transmit and receive RF signals over the air. Antenna assembly 270 may receive RF signals from communication interface 260 and transmit them over the air and receive RF signals over the air and provide them to communication interface 260.

Power supply 280 may include one or more power supplies that provide power to components of terminal 100. For example, power supply 280 may include one or more batteries and/or connections to receive power from other devices, such as an accessory outlet in an automobile, an external battery, or a wall outlet. Power supply 280 may also include metering logic to provide the user and components of terminal 100 with information about battery charge levels, output levels, power faults, etc.

As will be described in detail below, terminal 100, consistent with the principles of the embodiments described herein, may perform certain operations relating to adaptively configuring keypad 110 in response to user inputs or in response to instructions associated with processing logic 210. Terminal 100 may perform these operations in response to processing logic 210 executing software instructions of a keypad configuration/reprogramming application contained in a computer-readable medium, such as storage 220. A computer-readable medium may be defined as a physical or logical memory device and/or carrier wave.

The software instructions may be read into storage 220 from another computer-readable medium or from another device via communication interface 260. The software instructions contained in storage 220 may cause processing logic 210 to perform processes that will be described later. Alternatively, hardwired circuitry may be used in place of or in combination with software instructions to implement processes described herein. Thus, implementations consistent with the embodiments described herein are not limited to any specific combination of hardware circuitry and software.

Figure 3:
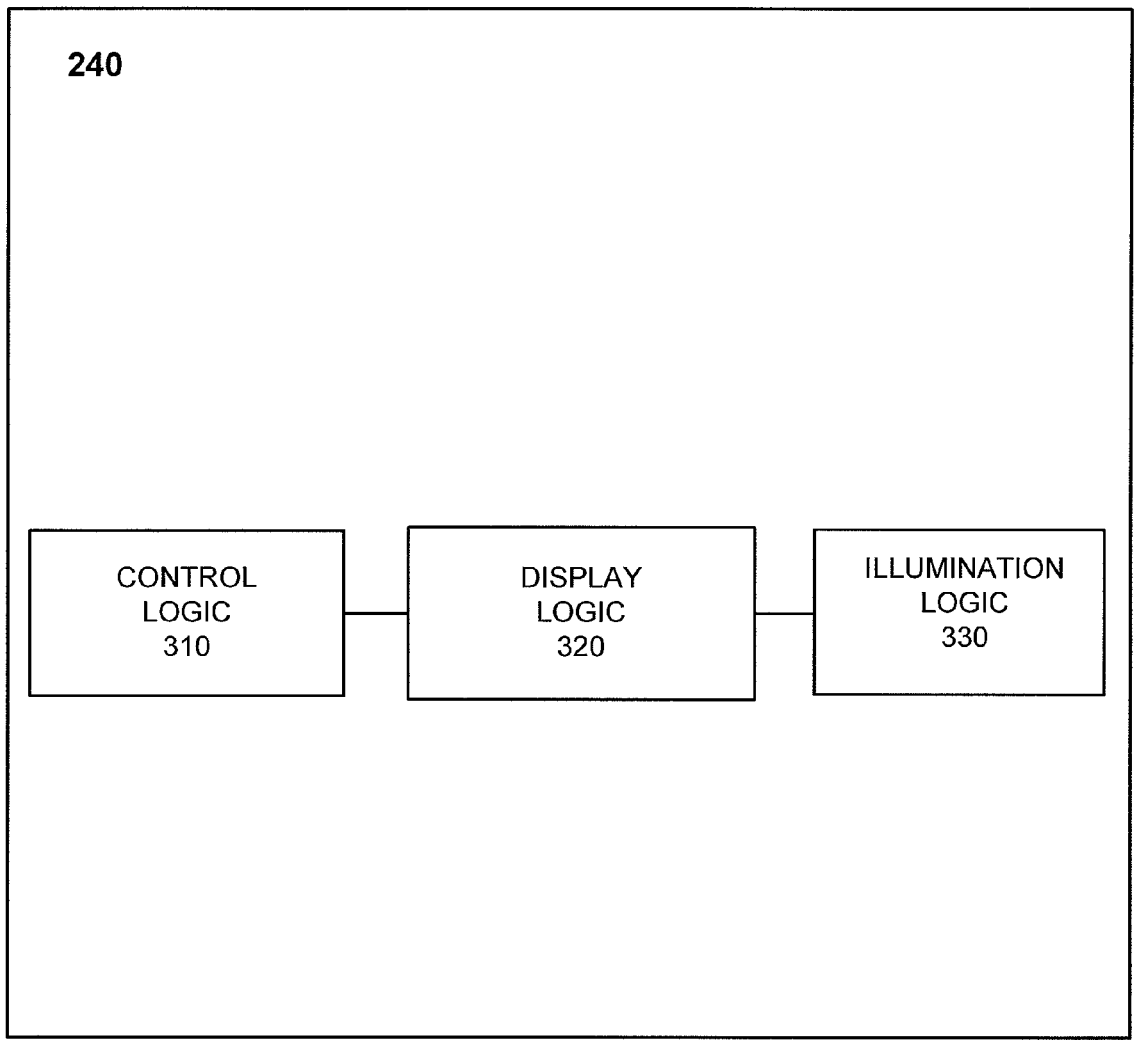
FIG. 3 illustrates an exemplary functional diagram of the programmable keypad logic of FIG. 2.

FIG. 3 illustrates an exemplary functional diagram of the programmable keypad logic 240 of FIG. 2. Programmable keypad logic 240 may include control logic 310, display logic 320, and illumination logic 330.

Control logic 310 may include logic that controls the operation of display logic 320, logic operating with display logic 320, and/or processes involved with display logic 320. Control logic 310 may be implemented as standalone logic or as part of processing logic 210. Moreover, control logic 310 may be implemented in hardware or software. Control logic 310 may receive inputs from a user (via control keys 120 and/or user interface logic 230) to control or change the display and function of keys 112 in keypad 110.

Display logic 320 may include logic to present information on keys 112 in keypad 110. Display logic 320 may include processing logic to interpret signals and instructions and display key information. Implementations of display logic 320 may include data structures (as shown in FIG. 4) that operate with illumination logic 330 to control information displayed on keys 112.

Illumination logic 330 may include logic to provide illumination to surfaces within keys 112 to provide information displayed/associated with keys 112. For example, illumination logic 330 may be used to provide back lighting or lighting to one of a number of sides of surfaces within keys 112 to change the character or information presented on keys 112. Implementations of illumination logic 330 may employ light emitting diodes (LEDs) or other types of devices to illuminate characters and/or surfaces within keys 112.

Figure 4:
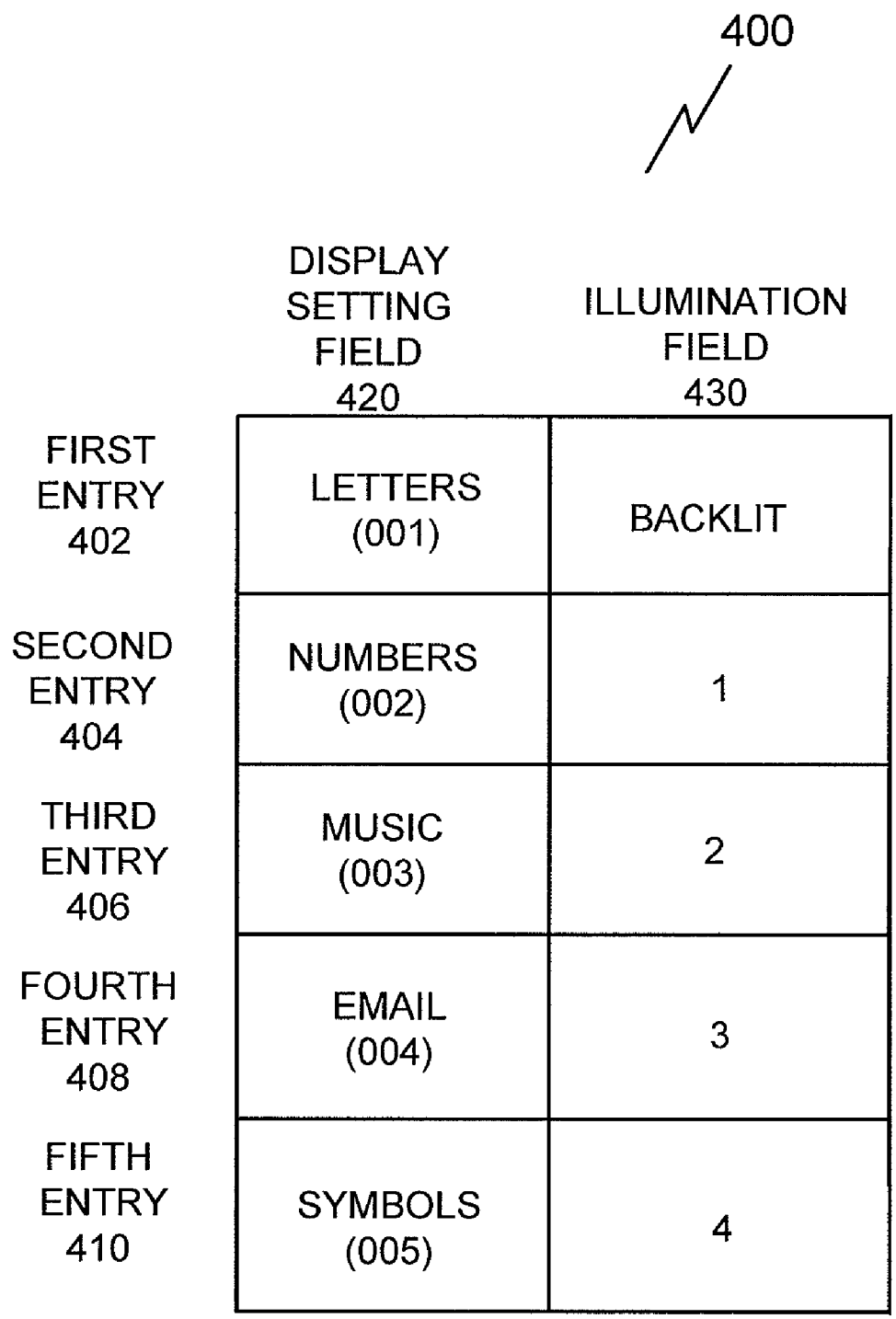
FIG. 4 illustrates an exemplary data structure.

FIG. 4 illustrates an exemplary data structure consistent with the embodiments described herein. Data structure 400 may include a computer-readable medium that can be used to store information in a machine-readable format and may be stored in storage 220. In an exemplary implementation, data structure 400 may be used to store information that is used to modify the information presented on keys 112 in keypad 110, as described in detail below.

Data structure 400 may include information arranged in fields, such as display setting field 420 and illumination field 430. Information in data structure 400 may be arranged in a row and column format to facilitate interpretation by a user of terminal 100 and/or user by processing logic 210. Entries 402-410 may be used to identify information associated with display setting field 420 and illumination field 430.

Display setting field 420 may include information that identifies a type of display that is presented to a user via keypad 110. For example, a user may see a "letters" keypad layout, a "numbers" keypad layout, a "music" keypad layout, an "email" keypad layout or a "symbols" keypad layout in keypad 110. Entries for display setting field 420 may include numeric identifiers, such as addresses, that can be used by processing logic 210 when processing information in data structure 400.

Illumination field 430 may include information about illumination sources used with configurations of terminal 100. For example, illumination field 430 may include information that identifies whether back lighting or which side lighting is used with an implementation of keypad 110. For example, in order to provide a "music" keypad layout, illumination field 430 may store a "2" indicating that a specific illumination source (e.g., LED) be activated, in order to provide the appropriate information on key 112, as described below.

Figure 5:
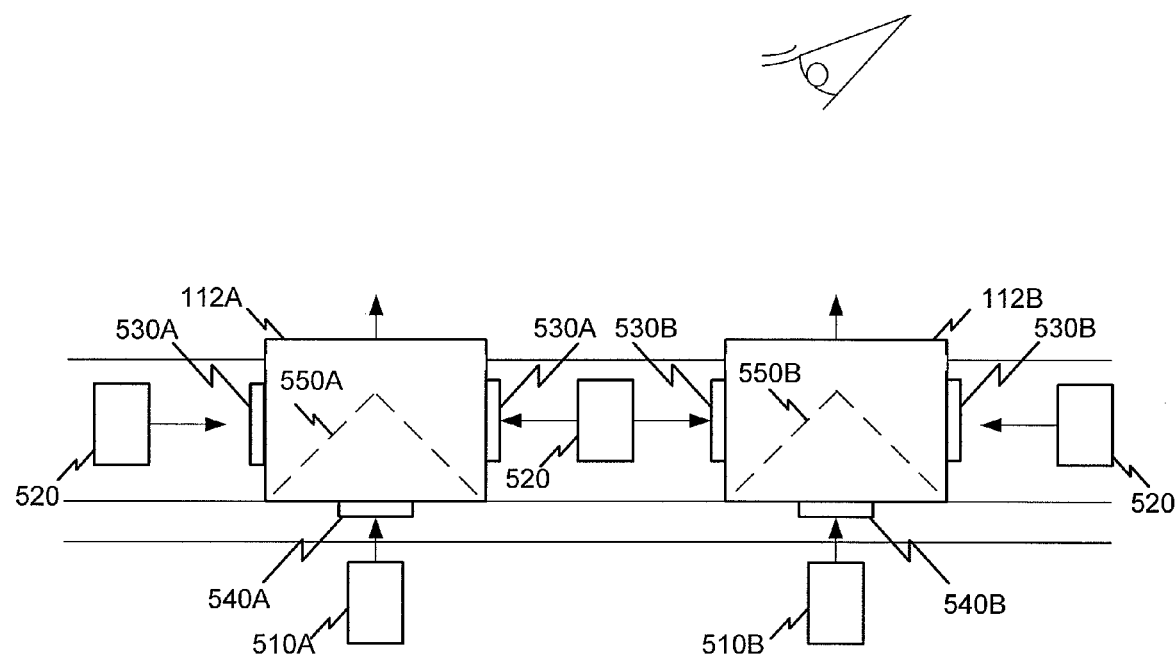
FIG. 5 illustrates an exemplary keypad implementation.

FIG. 5 shows an exemplary programmable keypad. Programmable keypad may include keys 112A-B, backlighting light emitting diodes (LEDs) 510A-B (referred to collectively as LEDs 510), side-lighting light emitting diodes (LEDs) 520, side panels 530A-B (referred to collectively as side panels 530), bottom panels 540A-B and surfaces 550A-B (referred to collectively as surfaces 550).

Backlighting LEDs 510 may include any type of light emitting diode used to provide backlighting for keys 112. The backlight produced by LEDs 510 may illuminate a transparent character(s) and/or symbol(s) on bottom panels 540 that may be visible through the top of keys 112. Backlighting LEDs 510 may be controlled (turned on/off) by illumination logic 330.

Side-lighting LEDs 520 may include any type of light emitting diode used to provide lighting to sides of keys 112. The light produced by LEDs 520 may illuminate a transparent character(s) and/or symbol(s) on side panels 530 that may be reflected from surfaces 550 to be visible through the top of keys 112. Side-lighting LEDs 520 may be controlled (turned on/off) by illumination logic 330.

Side panels 530 may include a sheet of material that includes a transparent character(s) and/or symbol(s) thereon. When light is applied from side-lighting LEDs 520 to side panels 530, the transparent character(s) and/or symbol(s) on side panels 530 may be displayed on surfaces 550.

Bottom panels 540 may include a sheet of material that includes a transparent character(s) and/or symbol(s) thereon. When light is applied from backlighting LEDs 510 to bottom panels 540, the transparent character(s) and/or symbol(s) on bottom panels 540 may be visible through the top of keys 112.

Surfaces 550 may include a transflective surface that may reflect light when light is applied to surfaces 550, and allow light to pass through surfaces 550 when light is applied from behind surfaces 550. For example, light from side-lighting LEDs 520 will be reflected upward by surfaces 550 and light from backlighting LEDs 510 will pass through surfaces 550. When the light source is turned off, the surface 550 may become dark or reflective. As shown, surfaces 550 may be angled so as to be both illuminated by side-lighting LEDs 520 and be visible from above to display a character to a user. The angle between surfaces 550 and the horizontal may be between 30 and 60 degrees for example. In other examples, the angle of surfaces 550 may vary or be changed based on the number of surfaces present, the placement of side-lighting LEDs 520 and/or the type of characters on surfaces 550.

Figure 6:
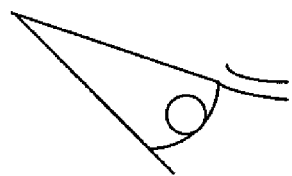
FIG. 6 illustrates a side view of an exemplary implementation of a programmable keypad.
Figure 6:
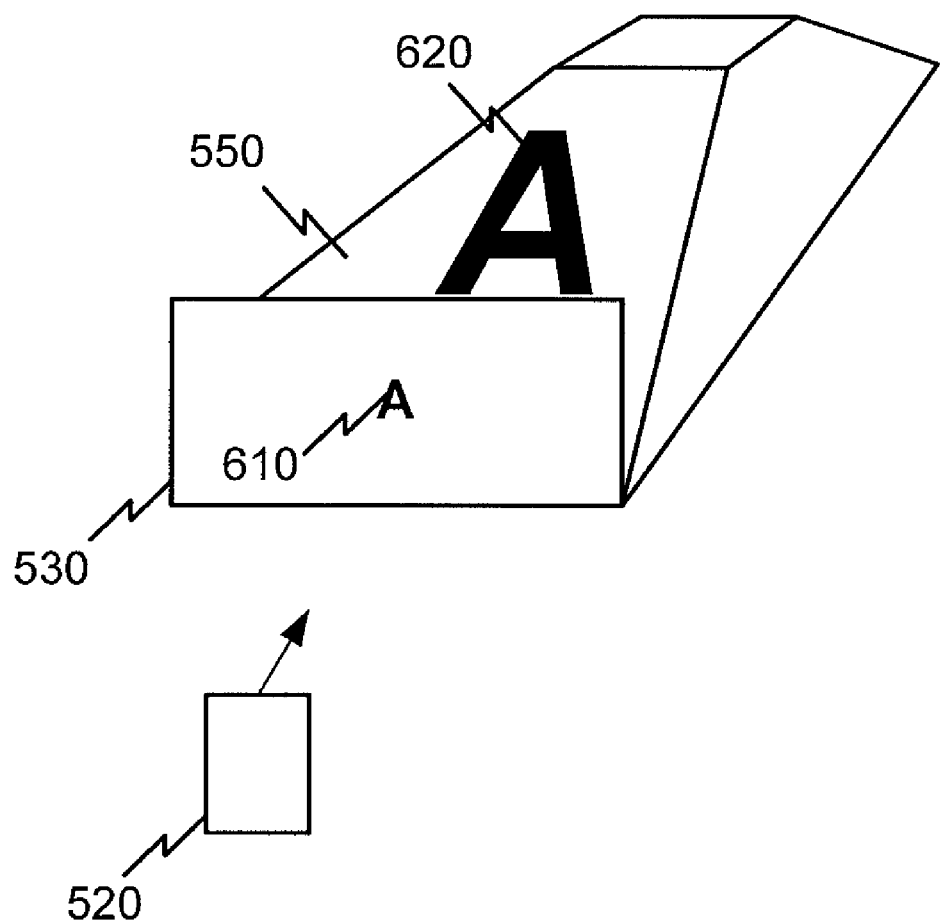

FIG. 6 illustrates another view of an exemplary implementation of a programmable keypad consistent with the principles of the embodiments. The view shown in FIG. 6 includes side-lighting LED 520, side panel 530, surface 550, information 610 and key information 620.

Information 610 may include a transparent character(s) and/or symbol(s) on side panel 530 as described above. In this example, information 610 may be the character "A."

Key information 620 may include light that has passed through side panel 530 that may form a character(s) and/or symbol(s) on surface 550. Key information 620 may be reflected up through the top of key 112 to provide information associated with key 112.

As described above for example, light from side-lighting LED 520 is directed toward side panel 530. Information 610 contained on side panel 530 is a transparent character "A," in this example. Light from side-lighting LED 520 may pass through information 610 (the character "A") and be projected onto surface 550. Key information 620 (character "A") may then be reflected from surface 550 upward (through key 112 not shown) to be displayed by and associated with key 112.

Figure 7:
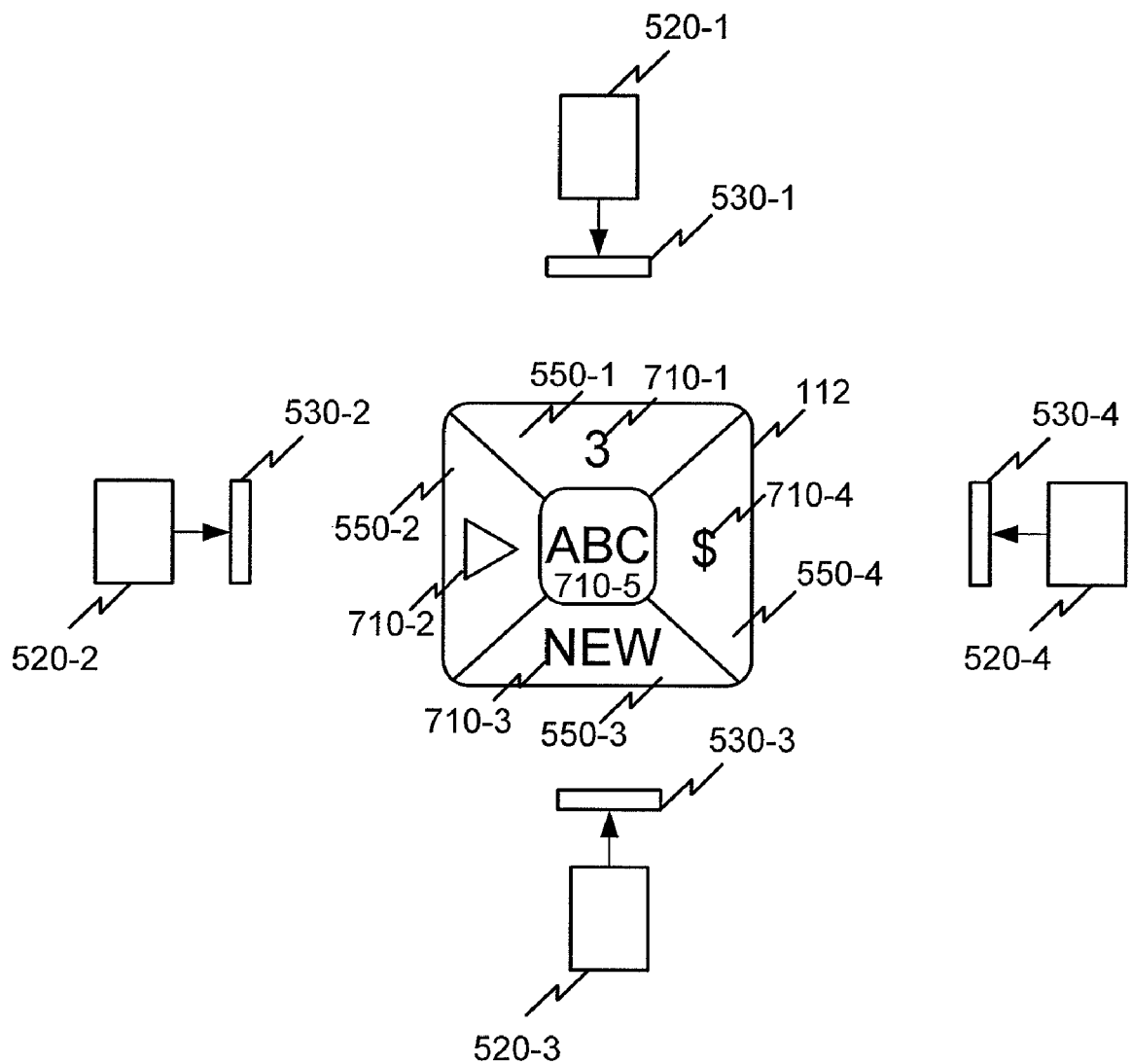
FIG. 7 illustrates a top view of an exemplary implementation of a programmable keypad.

FIG. 7 illustrates a top view of an exemplary implementation of a programmable keypad consistent with the principles described herein. This view of an exemplary implementation of programmable keypad as shown in FIG. 7 includes key 112, side-lighting LEDs 520-1 to 520-4, side panels 530-1 to 530-4, and key information 710-1 to 710-5. Backlighting LEDs 510 (not shown) may also be included below key 112.

As shown in FIG. 7, key 112 may be configured to display or present one of five key information(s) 710 (one of 710-1 to 710-5). By controlling one of backlighting LEDs 510 or side lighting LEDs 520 to illuminate one surface within key 112, five different types of keypad arrangements may be provided. For example, if keypad 110 is configured to be a letters keypad, key information 710-5 (the characters "ABC") may be displayed on key 112 by applying light from backlighting LEDs 510 (not shown) through a bottom panel 540 (not shown). If keypad 110 is configured to be a numeric keypad, side-lighting LED 520-1 may apply light to side panel 530-1 to project key information 710-1 (numeric character "3" in this example) on surface 550-1. If keypad 110 is configured to be a music keypad, side-lighting LED 520-2 may apply light to side panel 530-2 to project key information 710-2 (symbol ">" in this example) on surface 550-2. If keypad 110 is configured to be an email keypad, side-lighting LED 520-3 may apply light to side panel 530-3 to project key information 710-3 (word "new" in this example) on surface 550-3. If keypad 110 is configured to be a symbols keypad, side-lighting LED 520-4 may apply light to side panel 530-4 to project key information 710-4 (character "$" in this example) on surface 550-4. As described below, by controlling only one lighting source to provide light at any given time, keys 112 and/or keypad 110 may present five different types of keypad configurations to a user as shown in FIGS. 9A-E (described in detail below).

Figure 8:
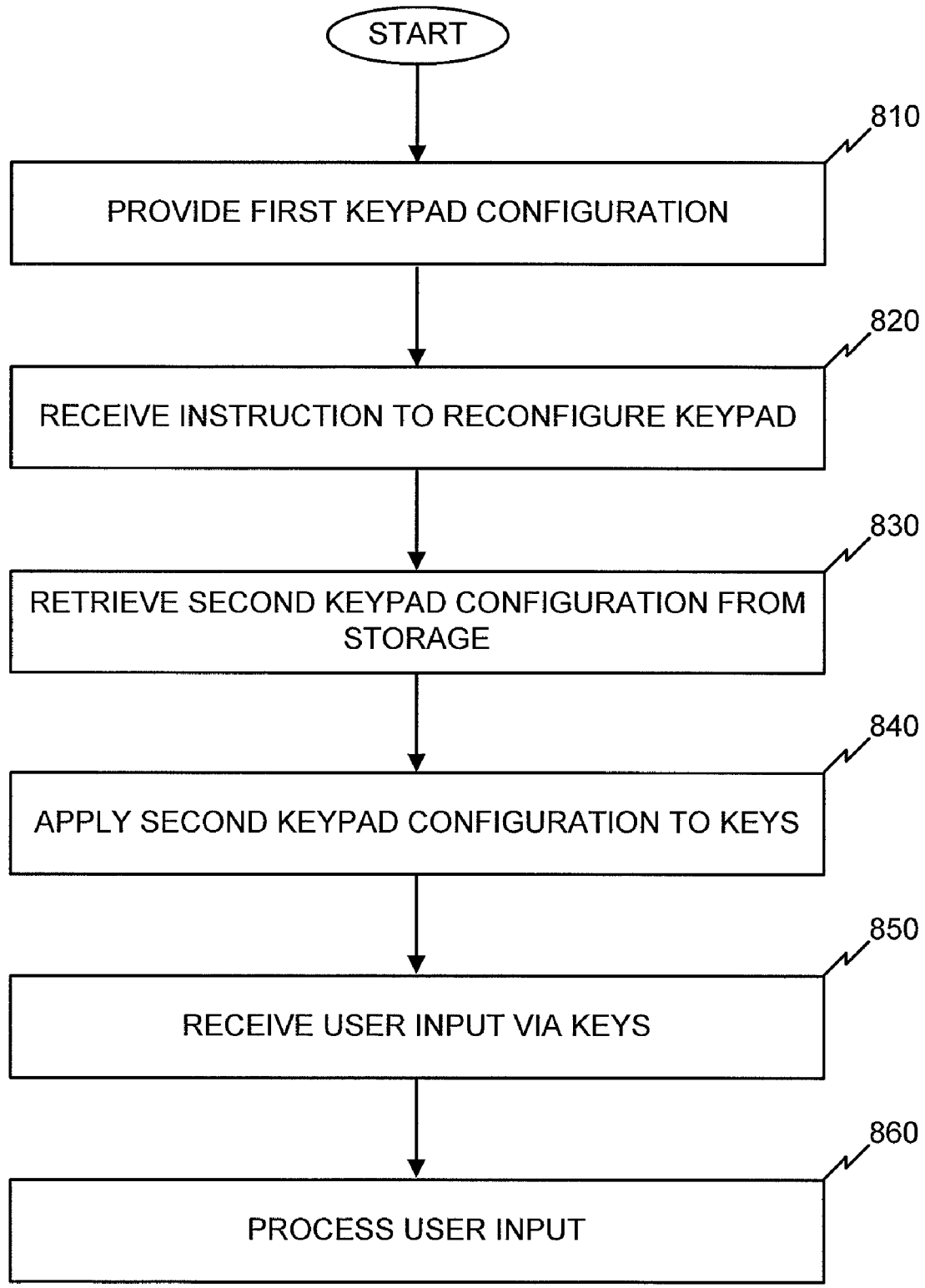
FIG. 8 is a flowchart of exemplary processing.
Figure 9A:
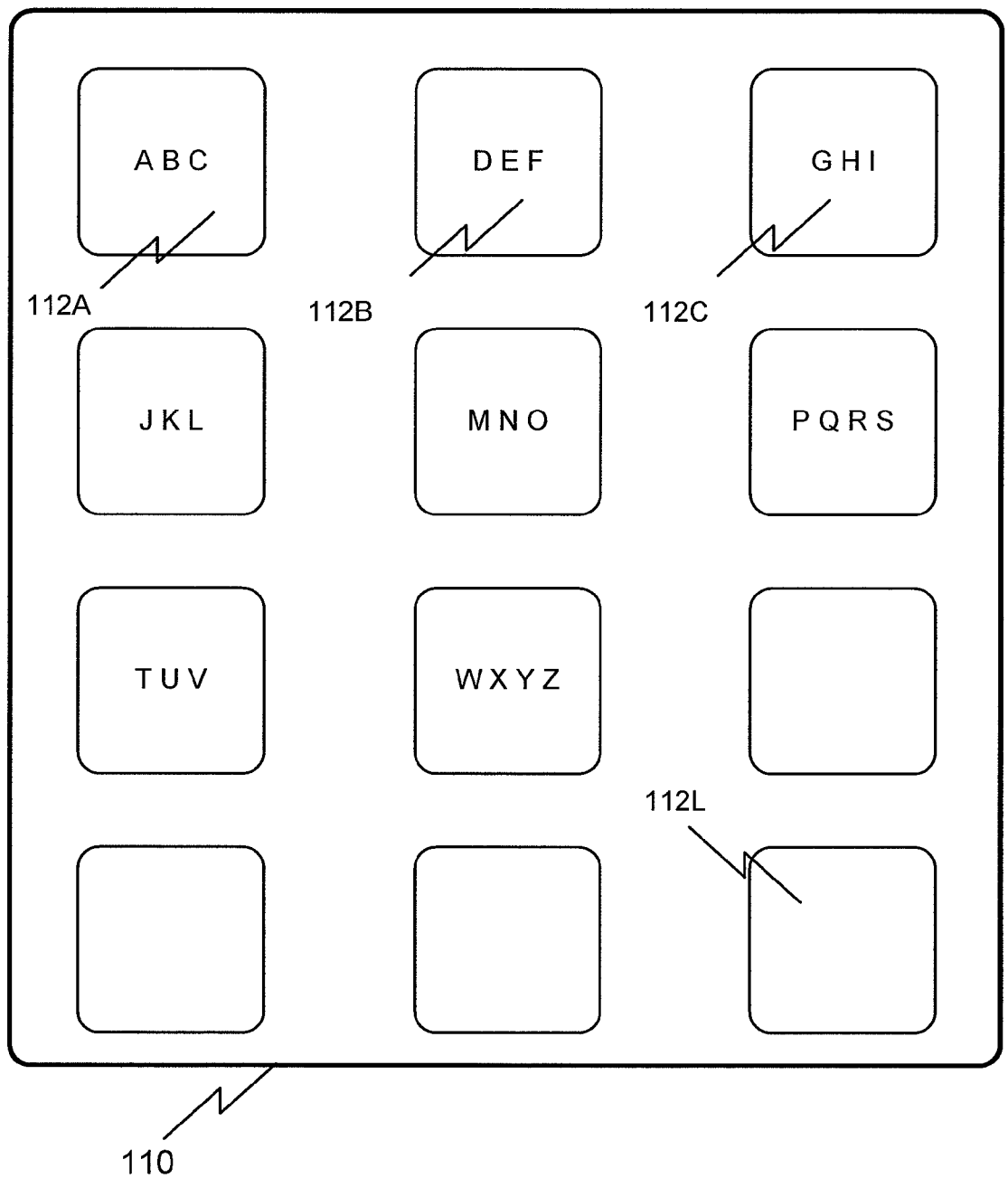
FIGS. 9A-9E illustrate examples of exemplary configurations of keypads in a mobile terminal that employs a programmable keypad.

FIG. 8 is a flowchart of exemplary processing consistent with the principles described herein. Terminal 100 may provide a first keypad configuration to a user of terminal 100 (act 810). For example, keypad 110 may be configured as a letters keypad as shown in FIG. 9A in order to create a text message. In order to provide the letters on each key 112 in the keypad configuration shown in FIG. 9A, keys 112A-L may be backlit using backlighting LEDs 510 (as shown in FIG. 5). As described above, programmable keypad logic 240 may use a data structure as shown in FIG. 4 in order to control and select the light source that may apply light to a selected surface within keys 112, in order to provide the selected keypad configuration. After creating and sending a text message for example, the user may wish to interact with a different keypad layout.

Terminal 100 may receive an instruction to reconfigure keypad 110 (act 820). For example, a user may be presented with a menu of selections via display 140 that allows the user to select a keypad layout from a number of available keypad layouts. For example, a user may be presented with menu allowing the user to select a first keypad layout that includes letters on keys 112, a second keypad layout that includes numbers on keys 112, a third keypad layout that includes text and/or symbols on keys 112 used to play music on terminal 110, a fourth keypad layout that includes text and/or symbols on keys 112 used to send and receive emails, and a fifth keypad layout that includes symbols on keys 112. The user may depress a control key 120 to select one of the available keypad layouts to reconfigure keypad 110.

Processing logic 210 may receive a signal from I/O logic 250 and may retrieve computer-readable instructions from storage 220 (act 830). For example, processing logic 210 may receive a signal associated with the control key 120 used to select one of the available keypad layouts. Processing logic 210 may then access data structure 400 and may determine that the user input is requesting a music keypad layout, such as the layout associated with entry 406 (FIG. 4). In other implementations, processing logic 210 may detect the launching of a particular application program stored in terminal 100, such as a media playing application, a text messaging (e.g., an e-mail program, an instant messaging program, etc.), detect an input associated with a particular function or application, and automatically access data structure 400 to identify a particular keypad layout.

In each case, processing logic 210 may provide the retrieved keypad layout to keys 112 from programmable keypad logic 240 (act 840). Assume that the relevant keypad layout is the music keypad layout as shown in FIG. 9C. In this case, control logic 310 (FIG. 3) may provide instructions to display logic 320 and illumination logic 330 to control the backlighting and side lighting LEDs (510 and 520 respectively) to select the appropriate light source to present the music keypad layout on keys 112.

The user may then interact with terminal 100 via keypad 110 based on the music keypad layout. For example, the user may depress skip ahead button on key 1121 (FIG. 9C) (act 850). Processing logic 210 may receive the signal for skip ahead button and may process the signal (act 860). For example, processing logic 210 may interact with programmable keypad logic 240 to perform a function associated with the current keypad layout. For example, processing logic 210 may interact with a memory containing songs associated with an album that is playing on terminal 100. Processing logic 210 may index to a next song of the stored album and may cause that song to be played over speaker 130.

FIGS. 9A-9E illustrate exemplary configurations of a mobile terminal that employ a programmable keypad consistent with the principles of the embodiments. The examples illustrated in FIGS. 9A-9E are representative of five types of keypad configurations that may be used with implementations of terminal 100 that employ a programmable keypad consistent with embodiments described herein. Substantially any type, configuration, or combination of keypad configurations may be used with terminal 100, therefore the example illustrated in FIGS. 9A-9E is representative, not limiting, of keypad configurations and combinations that may be used with terminal 100.

FIG. 9A illustrates a keypad 110 that is configured as a letters keypad. In this example, each of keys 112A-L may include letters on each of keys 112A-L. For example, the letters "ABC" may be displayed on key 112A, the letters "DEF" may be displayed on key 112B, etc.

Figure 9B:
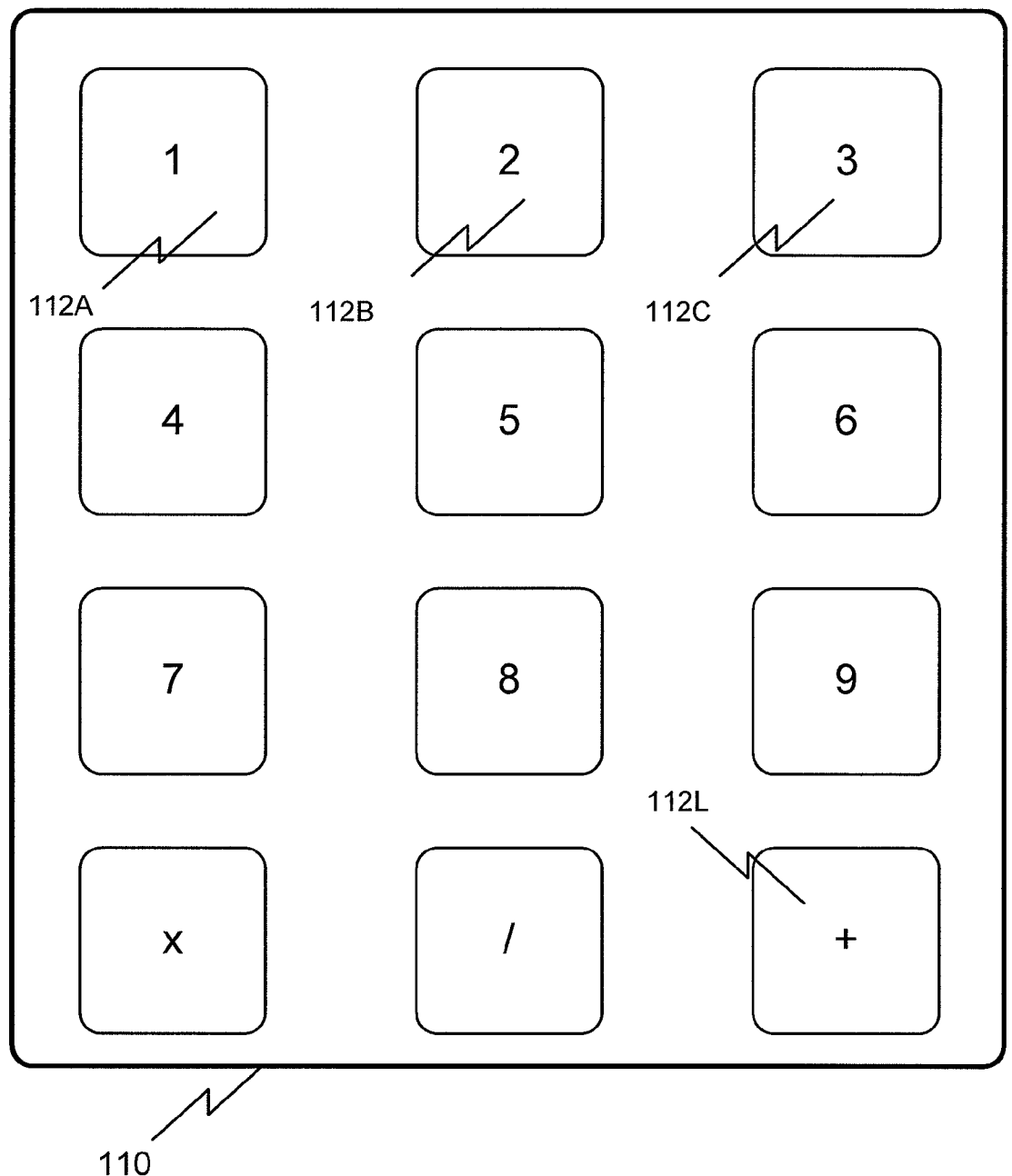
Figure 9C:
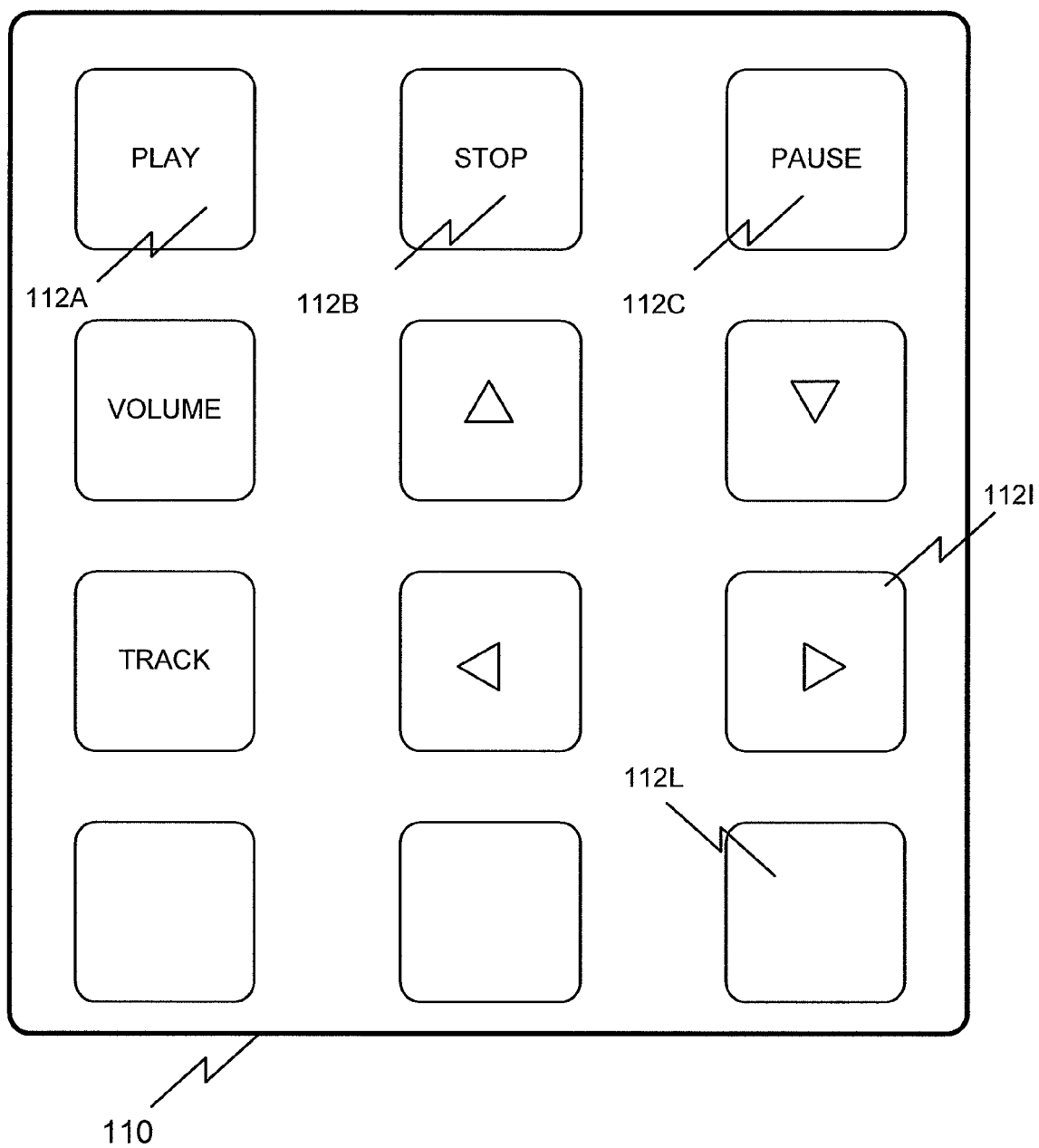

FIG. 9B illustrates a keypad 110 that is configured as a numeric keypad. In this example, each of keys 112A-L may be associated with a number or a mathematical operation. In this example, a user may use terminal 100 as a calculator or to dial a telephone number.

FIG. 9C illustrates a keypad 110 that is configured as a music keypad. For example, each of keys 112A-L may be associated with text or symbols that may allow a user to play music on terminal 100. For example, key 112A may display the word "Play" and key 112B may display the word "Stop."

Figure 9D:
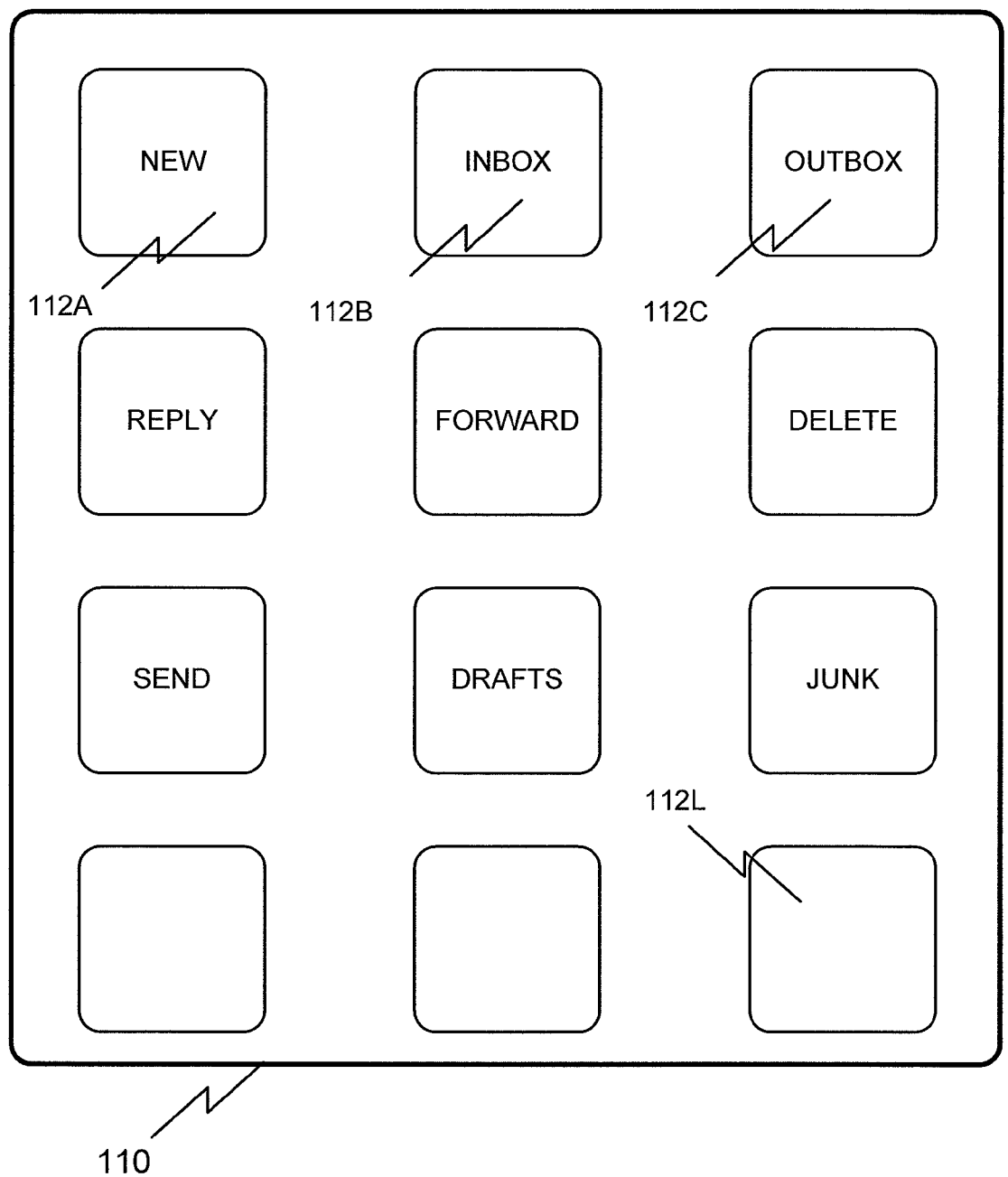

FIG. 9D illustrates a keypad 110 that is configured as an email keypad. For example, each of keys 112A-L may be associated with text that allows a user to interact with terminal 100 to send or receive emails. For example, key 112A may display the word "New" that may allow a user to create a "new" email.

Figure 9E:
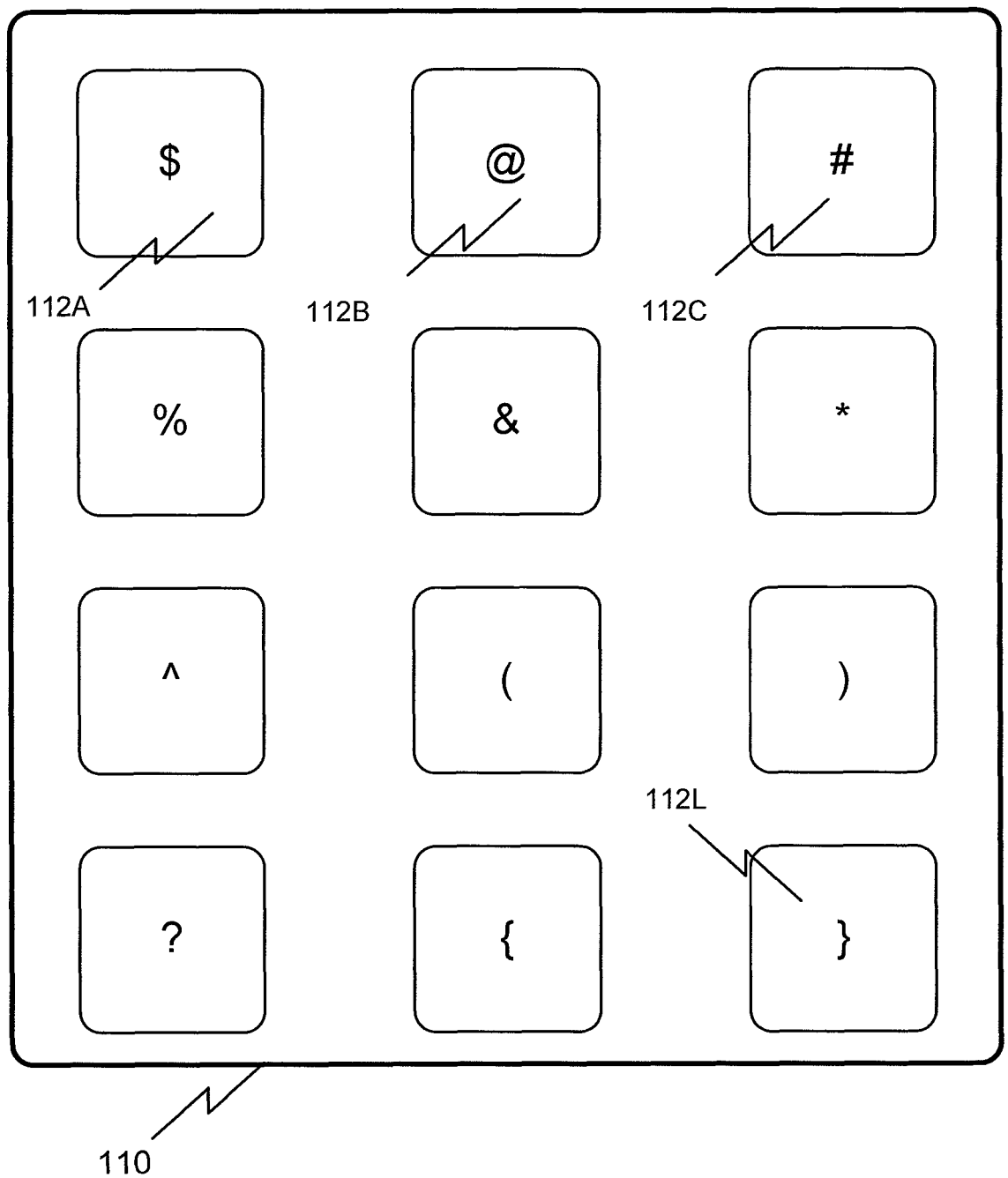

FIG. 9E illustrates a keypad 110 that is configured as a symbols keypad. For example, each of keys 112A-L may be associated with symbols not ordinarily found on keypads of mobile terminals. For example, key 112A may be associated with a "$" symbol.

CONCLUSION

Implementations described herein may facilitate providing a number of keypad configurations to a user via a programmable keypad. In some implementations, the keypad configurations may be application controlled and may be automatically provided in response to inputs associated with the particular applications.

In some implementations, terminal 100 may be configured to provide keypad layouts in number of languages based on user preferences. The user may also configure how information is arranged within keypad 110 by specifying features such as an arrangement of buttons, icons, images, etc.

The foregoing description of preferred embodiments of the embodiments provides illustration and description, but is not intended to be exhaustive or to limit the embodiments to the precise form disclosed. Modifications and variations are possible in light of the above teachings or may be acquired from practice of the embodiments.

While a series of acts has been described with regard to FIG. 8, the order of the acts may be modified in other implementations consistent with the principles of the embodiments. Further, non-dependent acts may be performed in parallel.

It will be apparent to one of ordinary skill in the art that aspects, as described herein, may be implemented in many different forms of software, firmware, and hardware. The actual software code or specialized control hardware used to implement aspects described herein is not limiting of the embodiments. Thus, the operation and behavior of the aspects were described without reference to the specific software code—it being understood that one of ordinary skill in the art would be able to design software and control hardware to implement the aspects based on the description provided herein.

Further, certain portions of the embodiments may be implemented as "logic" that performs one or more functions. This logic may include hardware, such as hardwired logic, an application specific integrated circuit, a field programmable gate array or a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communication device, comprising:
 a keypad assembly comprising:
  a plurality of keys, where each of the plurality of keys contains a plurality of surfaces for displaying information, and where at least some of the plurality of surfaces are arranged in a generally pyramidal shaped configuration, and
  a plurality of backlighting light emitting diodes (LEDs) and a plurality of side-lighting LEDs, where each one of the plurality of backlighting LEDs and side-lighting LEDs selectively illuminates one of the plurality of surfaces for displaying information; and
 logic configured to:
  receive a keypad selection from a user, and control the plurality of backlighting light emitting diodes (LEDs) and the plurality of side-lighting LEDs to selectively display information, via the one of the plurality of display surfaces, on each of the plurality of keys based on the received keypad selection.

2. The mobile communication device of claim 1, where a first displayed character is displayed on a key, of the plurality of keys, by illuminating a first surface of the key using a first one of the plurality of backlighting LEDs or a first one of the plurality of side-lighting.

3. The mobile communication device of claim 2, where a second displayed character is displayed on the key by illuminating a second surface of the key using a second one of the plurality of backlighting LEDs or a second one of the plurality of side-lighting.

4. The mobile communication device of claim 1, where the received keypad selection includes a selection corresponding to at least one of:
　a letters keypad, a numbers keypad, a music keypad, an email keypad, or a symbols keypad.
　a letters keypad, a numbers keypad, a music keypad, an email keypad, or a symbols keypad.

5. A system, comprising:
　first, second, third, fourth, and fifth illumination sources, including backlighting illumination sources and side-lighting illumination sources;
　a processor; and
　a memory that stores instruction that when executed by the processor, cause the processor to:
　receive an input, by a programmable keypad, from a user, where the programmable keypad includes a plurality of keys, where each of the plurality of keys contains five surfaces for displaying information, where the five surfaces are arranged in a generally pyramidal shaped configuration; and
　receive a request for a first configuration of the programmable keypad, and
　control the first illumination source to illuminate a first one of the five surfaces for displaying information to provide the requested first configuration of the programmable keypad,
　receive a request for a second configuration of the programmable keypad, and
　control the second illumination source to illuminate a second one of the five surfaces for displaying information to provide the requested second configuration of the programmable keypad,
　receive a request for a third configuration of the programmable keypad, and
　control the third illumination source to illuminate a third one of the five surfaces for displaying information to provide the requested third configuration of the programmable keypad,
　receive a request for a fourth configuration of the programmable keypad, and
　control the fourth illumination source to illuminate a fourth one of the five surfaces for displaying information to provide the requested fourth configuration of the programmable keypad, and
　receive a request for a fifth configuration of the programmable keypad, and
　control the fifth illumination source to illuminate a fifth one of the five surfaces for displaying information to provide the requested fifth configuration of the programmable keypad.

6. The system of claim 5, where the programmable keypad includes a plurality of keys, where each of the plurality of keys contains first, second, third, fourth, and fifth surfaces, where four of the five surfaces are angled with respect to a bottom surface of the programmable keypad.

7. The system of claim 6, where the requested first configuration, of the programmable keypad, is displayed on the first one of the five surfaces of each of the plurality of keys.

8. The system of claim 7, where the requested second configuration, of the programmable keypad, is displayed on the second one of the five surfaces of each of the plurality of keys.

9. The system of claim 8, where the first, second, third, fourth, and fifth ones of the five surfaces define a recess formed in a bottom of each of the plurality of keys.

10. A method, comprising:
　providing a first keypad layout, via a programmable keypad, using at least first, second, and third backlighting and side-lighting illumination sources, where the keypad includes a plurality of keys and where each of the plurality of keys contains at least three surfaces for displaying information, where the at least three surfaces are arranged in a generally pyramidal shaped configuration, with respect to each other;
　receiving a programmable keypad selection; and
　providing a second keypad layout, via the programmable keypad, using a second illumination source to selectively illuminate a second of the at least three surfaces in response to the selection.

11. The method of claim 10, where providing the first keypad layout further comprises:
　providing a first character on a first key within the programmable keypad.

12. The method of claim 11, where providing the second keypad layout further comprises:
　providing a second character on the first key within the programmable keypad.

13. The method of claim 12, where the first character is provided on a first surface of the first key and the second character is provided on a second surface of the first key.

14. The method of claim 13, where the first and second surfaces of the first key are located on inner surfaces of the first key.

* * * * *

UNITED STATES PATENT AND TRADEMARK OFFICE
CERTIFICATE OF CORRECTION

| | | |
|---|---|---|
| PATENT NO. | : 7,932,840 B2 | |
| APPLICATION NO. | : 11/747278 | |
| DATED | : April 26, 2011 | |
| INVENTOR(S) | : Michael Henriksson | |

It is certified that error appears in the above-identified patent and that said Letters Patent is hereby corrected as shown below:

In Claim 4, lines 6 - 7 (column 11, lines 21 and 22) should be deleted.

Signed and Sealed this
Twenty-eighth Day of February, 2012

David J. Kappos
*Director of the United States Patent and Trademark Office*